United States Patent
Templin et al.

(10) Patent No.: US 8,016,134 B1
(45) Date of Patent: Sep. 13, 2011

(54) HUNTER GEAR ORGANIZER AND HANGER SYSTEM

(76) Inventors: Benjamin S. Templin, Burlington, WI (US); Thomas J. Templin, Muskego, WI (US)

( * ) Notice: Subject to any disclaimer, the term of this patent is extended or adjusted under 35 U.S.C. 154(b) by 0 days.

(21) Appl. No.: 13/074,301

(22) Filed: Mar. 29, 2011

(51) Int. Cl.
*A47F 7/00* (2006.01)

(52) U.S. Cl. .................. 211/85.7; 211/107; 211/197

(58) Field of Classification Search ............ 211/85.7, 211/196, 205, 107, 175, 207, 208, 190, 99–104, 211/64, 197, 165, 113; 248/218.4, 230.1, 248/230.8, 230.9
See application file for complete search history.

(56) References Cited

U.S. PATENT DOCUMENTS

| | | | | |
|---|---|---|---|---|
| 3,393,888 | A * | 7/1968 | Henningsgard | 248/230.8 |
| 4,744,537 | A * | 5/1988 | Buckley | 248/219.1 |
| 5,263,675 | A * | 11/1993 | Roberts et al. | 248/219.4 |
| RE36,276 | E * | 8/1999 | Smith | 182/187 |
| 6,059,240 | A * | 5/2000 | Gorsuch | 248/219.4 |
| 6,086,031 | A * | 7/2000 | Renfro | 248/218.4 |
| 6,330,989 | B1 * | 12/2001 | Okamoto | 248/74.1 |
| 6,478,272 | B1 * | 11/2002 | McKinsey et al. | 248/216.1 |
| 6,708,832 | B1 * | 3/2004 | Hannon | 211/107 |
| 7,861,987 | B2 * | 1/2011 | Gorsuch et al. | 248/219.1 |
| 2003/0173484 | A1 * | 9/2003 | Hsieh | 248/291.1 |
| 2003/0178255 | A1 * | 9/2003 | Auer | 182/187 |
| 2003/0192741 | A1 * | 10/2003 | Berkbuegler | 182/187 |
| 2005/0016795 | A1 * | 1/2005 | Skipper | 182/100 |
| 2005/0150851 | A1 * | 7/2005 | Norris | 211/107 |
| 2007/0114096 | A1 * | 5/2007 | Skipper | 182/116 |
| 2007/0131482 | A1 * | 6/2007 | Maloney | 182/187 |
| 2007/0261919 | A1 * | 11/2007 | Roe | 182/187 |
| 2008/0156588 | A1 * | 7/2008 | Butcher | 182/200 |
| 2009/0321186 | A1 * | 12/2009 | Louchart | 182/188 |
| 2010/0219302 | A1 * | 9/2010 | Krasnicki | 248/121 |

\* cited by examiner

*Primary Examiner* — Jennifer E. Novosad

(74) *Attorney, Agent, or Firm* — Donald J. Esler

(57) ABSTRACT

A hunter gear organizer and hanger system preferably includes a mounting strut, a hanger arm and a gear holder arm. The mounting strut includes a rod member, a pair of U-shaped members and an attachment loop. A ratchet strap includes a strap and a ratchet mechanism. The strap is secured to the mounting strut and around a tree. The ratchet mechanism is actuated to secure the mounting strut to the tree. The hanger arm preferably includes a mounting clamp, a support tube, a bow hanger and a quiver hanger. The bow hanger includes a bow base member and a bow hook portion. The gear holder arm preferably includes the mounting clamp, a gear support tube, a gear pouch and a drink pouch. An accessory hanger includes the mounting clamp, an accessory base member, an accessory hook and a cross hanger.

20 Claims, 9 Drawing Sheets

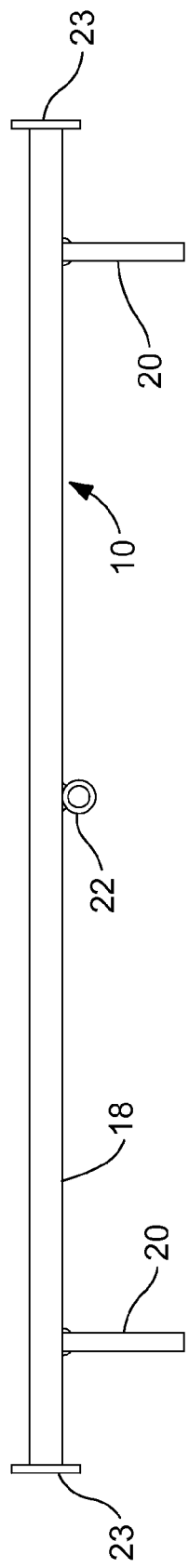
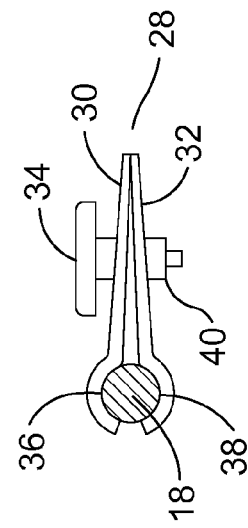
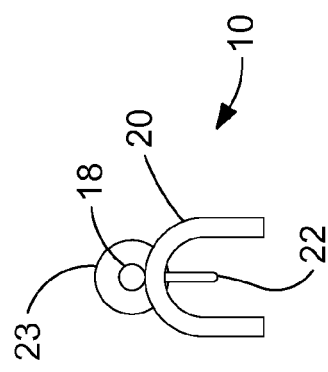
FIG. 4
FIG. 6
FIG. 5

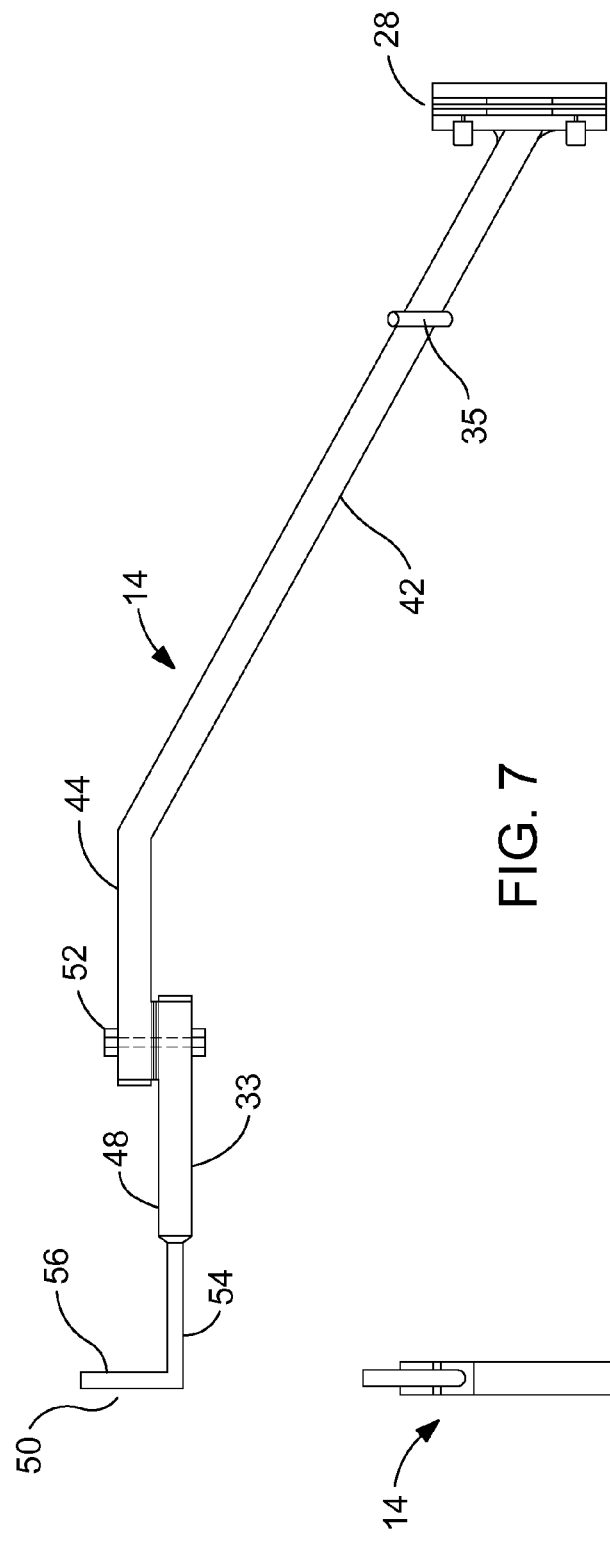
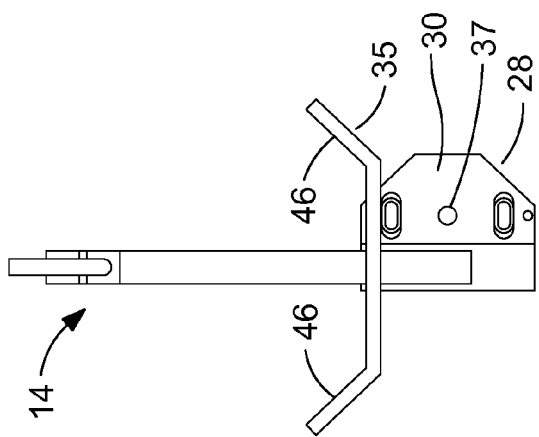
FIG. 7
FIG. 8

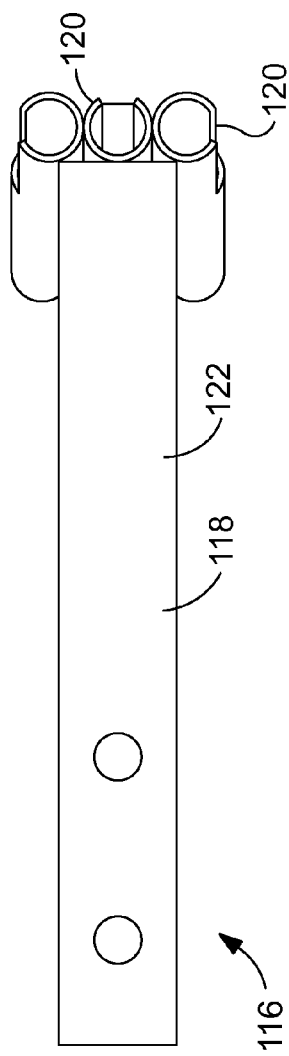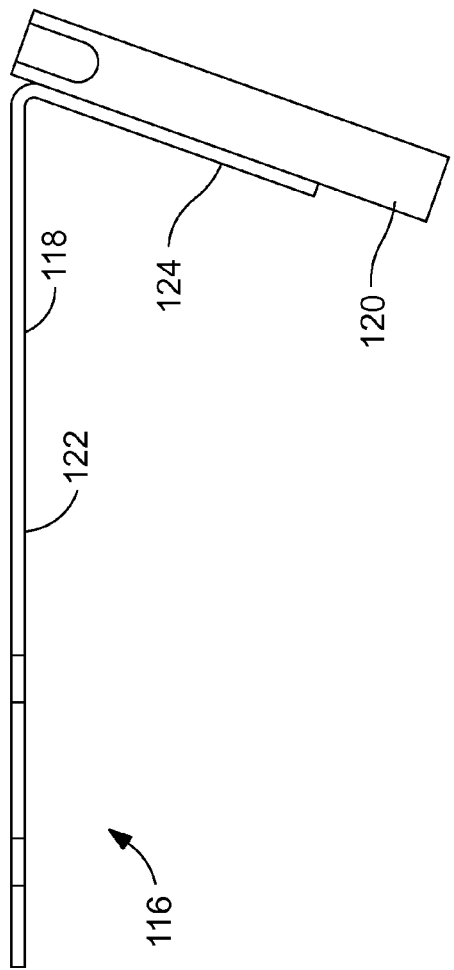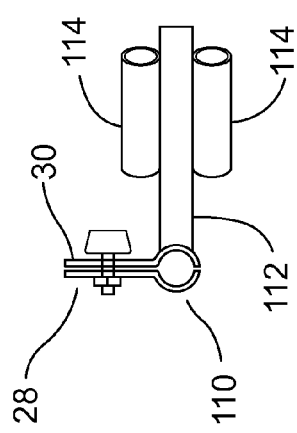
FIG. 13
FIG. 14
FIG. 12

HUNTER GEAR ORGANIZER AND HANGER SYSTEM

BACKGROUND OF THE INVENTION

1. Field of the Invention

The present invention relates generally to hunting and more specifically to a hunter gear organizer and hanger system, which is attachable to a tree without damaging the tree.

2. Discussion of the Prior Art

The prior art includes various systems for hanging hunting gear and the like on a tree. However, it appears that the prior art does not disclose a hunter gear organizer and hanger system, which is attachable to a tree without damaging the tree.

Accordingly, there is a clearly felt need in the art for a hunter gear organizer and hanger system, which retains drinks, food, bows, quivers, video cameras and other suitable hunting gear.

SUMMARY OF THE INVENTION

The present invention provides a hunter gear organizer and hanger system, which is attachable to a tree without damaging the tree. The hunter gear organizer and hanger system preferably includes a mounting strut, a hanger arm and a gear holder arm. The mounting strut includes a rod member, a pair of generally U-shaped members and an attachment loop. A closed end of one of the U-shaped members is attached to substantially one end of the rod member. A closed end of the other one of the U-shaped members is attached to substantially the other end of the rod member. The attachment loop is attached to the rod member, between the pair of U-shaped members. A ratchet strap includes a strap and a ratchet mechanism. An end of the strap is inserted through the attachment loop. The strap is wrapped around a vertical portion of a tree. The end of the strap is inserted into the ratchet mechanism. The ratchet mechanism is actuated, until the mounting strut is secured against the tree.

The hanger arm preferably includes a mounting clamp, a support tube, a bow hanger and a quiver hanger. The mounting clamp includes a first clamp plate, a second clamp plate and at least one finger bolt. A first channel is formed in one end of the first clamp plate and a second channel is formed in one end of the second clamp plate. The first and second channels are sized to receive an outer perimeter of the rod member. At least one clamping nut is attached to the second clamp plate and a bolt hole is formed the first clamp plate. The finger bolt is inserted through the bolt hole and threadably engaged with the clamping nut. One end of the support tube is attached to the first clamp plate. The quiver hanger is attached to substantially the first end of the support tube. The bow hanger includes a bow base member and a bow hook portion. One end of the bow base member is pivotally retained by a second end of the support tube. The bow hook portion extends from the other end of the bow base member.

The gear holder arm preferably includes a gear support tube, the mounting clamp, a gear pouch and a drink pouch. The mounting clamp is attached to a first end of the gear support tube. The gear pouch preferably includes a gear peripheral frame, a gear fabric pouch and a gear bottom plate. The gear peripheral frame has a general C-shape. Each end of the gear peripheral frame is attached to the gear support tube. A perimeter of the gear fabric pouch is attached to the gear peripheral frame and the gear support tube. The gear bottom plate is retained in a bottom of the gear fabric pouch. The drink pouch preferably includes a drink peripheral frame, a drink fabric pouch and a drink bottom plate. The drink peripheral frame has a general C-shape. Each end of the drink peripheral frame is attached to the gear support tube. A perimeter of the drink fabric pouch is attached to the drink peripheral frame and the drink support tube. The drink bottom plate is retained in a bottom of the drink fabric pouch.

An accessory hanger includes the mounting clamp, an accessory base member, an accessory hook and a cross hanger. The mounting clamp is attached to a first end of the accessory base member. The cross hanger is attached across the accessory base member. The accessory hook extends from a second end of the accessory base member. A camera mount accessory includes a camera support strip and a tripod head. One end of the camera support strip is attached to a second end of the gear support tube. The tripod head is attached to the other end of the camera support strip. A strut concealment stem support includes the mounting clamp, a stem support tube and at least one stem tube. A first end of the stem support tube is attached to the mounting clamp and the at least one stem tube is attached to a second end of the stem support tube. Each stem tube is sized to receive a real or artificial branch of a tree. A gear concealment stem support includes a gear support strip and at least one stem tube. One end of the gear support strip is attached to a second end of the gear support tube and the at least one stem tube is attached to the other end of the gear support strip.

Accordingly, it is an object of the present invention to provide a hunter gear organizer and hanger system, which is attachable to a tree without damaging the tree.

Finally, it is another object of the present invention to provide a hunter gear organizer and hanger system, which retains drinks, food, bows, quivers, video cameras and other suitable hunting gear.

These and additional objects, advantages, features and benefits of the present invention will become apparent from the following specification.

BRIEF DESCRIPTION OF THE DRAWINGS

FIG. 4 is a side view of a mounting strut of a hunter gear organizer and hanger system in accordance with the present invention.

FIG. 5 is an end view of a mounting strut of a hunter gear organizer and hanger system in accordance with the present invention.

FIG. 6 is an end view of a mounting clamp of a hunter gear organizer and hanger system in accordance with the present invention.

FIG. 7 is a side view of a hanger arm of a hunter gear organizer and hanger system in accordance with the present invention.

FIG. 8 is an end view of a hanger arm of a hunter gear organizer and hanger system in accordance with the present invention.

FIG. 12 is a top view of a strut concealment stem support of a hunter gear organizer and hanger system in accordance with the present invention.

FIG. 13 is a top view of a gear concealment stem support of a hunter gear organizer and hanger system in accordance with the present invention.

FIG. 14 is a side view of a gear concealment stem support of a hunter gear organizer and hanger system in accordance with the present invention.

DETAILED DESCRIPTION OF THE PREFERRED EMBODIMENTS

Figure 1:
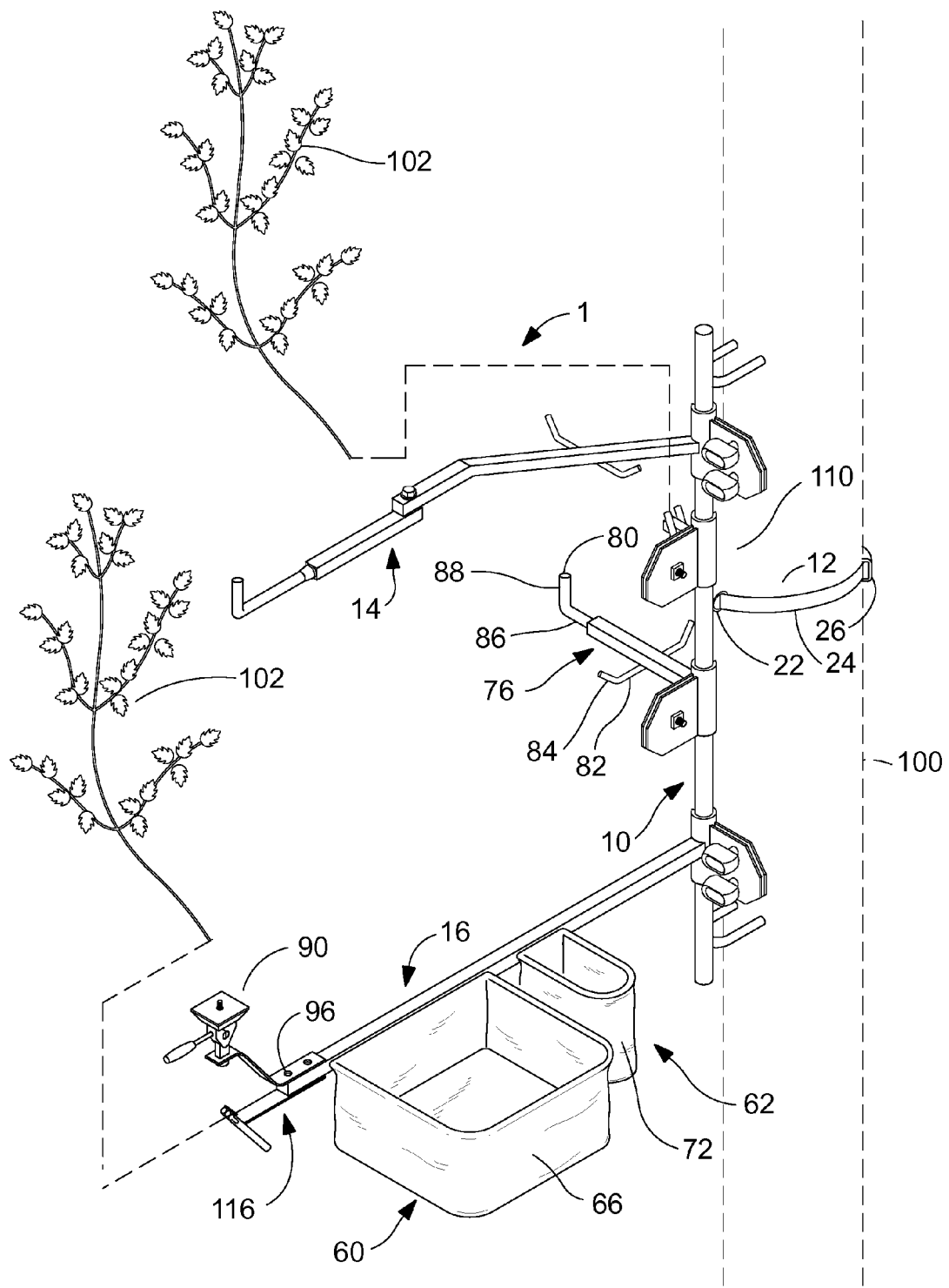
FIG. 1 is a perspective view of a hunter gear organizer and hanger system in accordance with the present invention.
Figure 2:
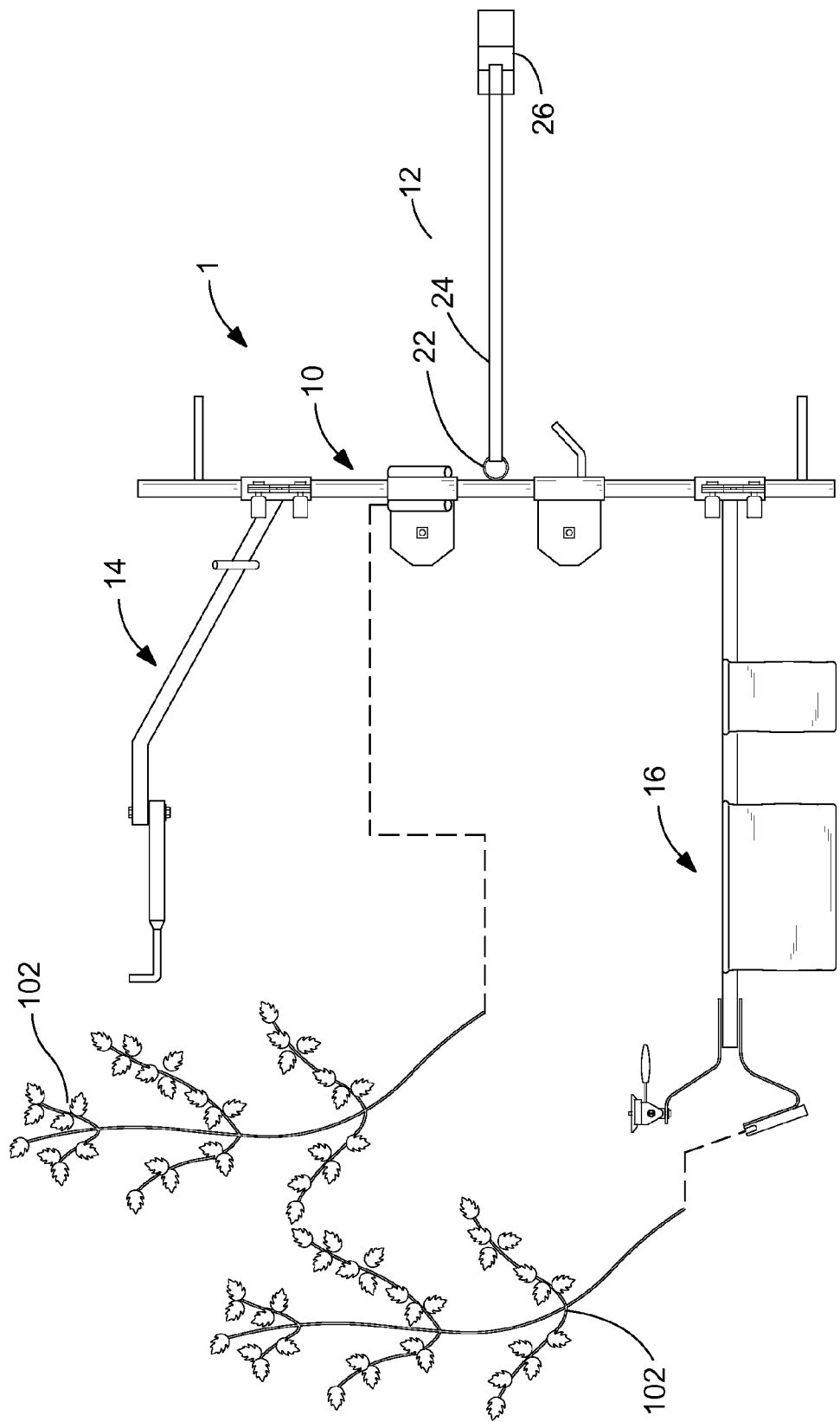
FIG. 2 is a side view of a hunter gear organizer and hanger system in accordance with the present invention.
Figure 3:
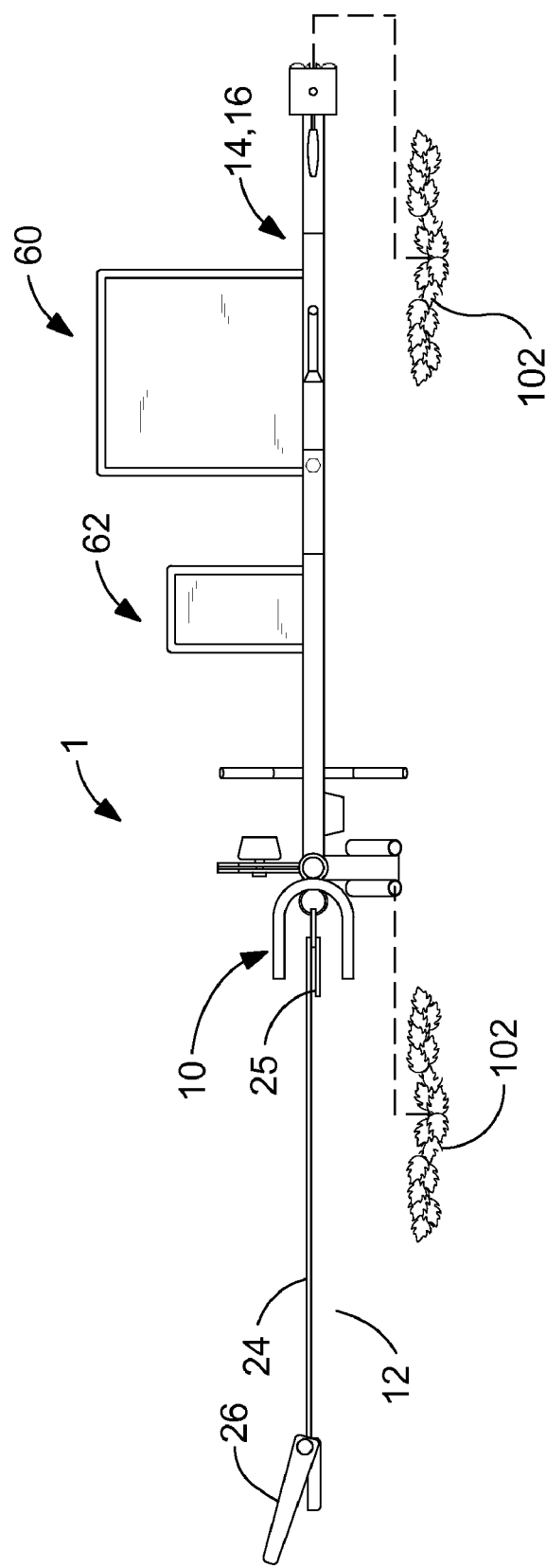
FIG. 3 is a top view of a hunter gear organizer and hanger system in accordance with the present invention.

With reference now to the drawings, and particularly to FIG. 1, there is shown a perspective view of a hunter gear organizer and hanger system 1. With reference to FIGS. 2-3, the hunter gear organizer and hanger system 1 preferably includes a mounting strut 10, a hanger arm 14 and a gear holder arm 16. With reference to FIGS. 4-5, the mounting strut 10 includes a rod member 18, a pair of generally U-shaped members 20 and an attachment loop 22. A closed end of one of the U-shaped members 20 is attached to substantially one end of the rod member 18 with welding or the like. A closed end of the other one of the U-shaped members 20 is attached to substantially the other end of the rod member 18. The attachment loop 22 is preferably attached to the rod member 18, between the pair of U-shaped members 20 with welding or the like. Each end of the rod member 18 may be terminated with a washer 23 or the like.

A ratchet strap 12 includes a strap 24 and a ratchet mechanism 26. An end 25 of the strap 24 is inserted through the attachment loop 22. The strap 24 is wrapped around a vertical portion of a tree 100. The strap end 25 is inserted into the ratchet mechanism 26. The ratchet mechanism 26 is actuated, until the mounting strut 19 is secured against the tree 100. The ratchet mechanism 26 is preferably lockable with a paddle lock or the like. The ratchet mechanism 26 may is preferably purchased from any suitable retailer.

With reference to FIGS. 6-8, the hanger arm 14 preferably includes a mounting clamp 28, a support tube 30, a bow hanger 33 and a quiver hanger 35. The mounting clamp 28 includes a first clamp plate 30, a second clamp plate 32 and at least one finger bolt 34. A first channel 36 is formed in one end of the first clamp plate 30 and a second channel 38 is formed in one end of the second clamp plate 32. The first and second channels are sized to receive an outer perimeter of the rod member 18. At least one clamping nut 40 is preferably attached to the second clamp plate with welding or the like and a bolt hole is formed the second clamp plate 32. The finger bolt 34 is inserted through the bolt hole and threadably engaged with the clamping nut 40. A lock hole 37 is preferably formed through the first and second clamp plates 32 to receive bolt of a paddle lock or the like.

The support tube 30 preferably includes an angled portion 42 and a horizontal portion 44. One end of the angled portion 42 is attached to the first clamp plate 30 with welding or the like. The horizontal portion 44 extends from the other end of the angled portion 42. Each end 46 of the quiver hanger 35 is preferably bent upwards. The quiver hanger 35 is preferably attached to substantially the first end of the support tube 30 with welding or the like. The bow hanger 33 preferably includes a bow base member 48 and a bow hook portion 50. One end of the bow base member 48 is pivotally retained at a second end of the horizontal portion 44 with bolt 52 or the like. The bow hook portion 50 preferably includes a horizontal portion 54 and a vertical portion 56. The horizontal portion 54 extends from the other end of the bow base member 48.

Figure 9:
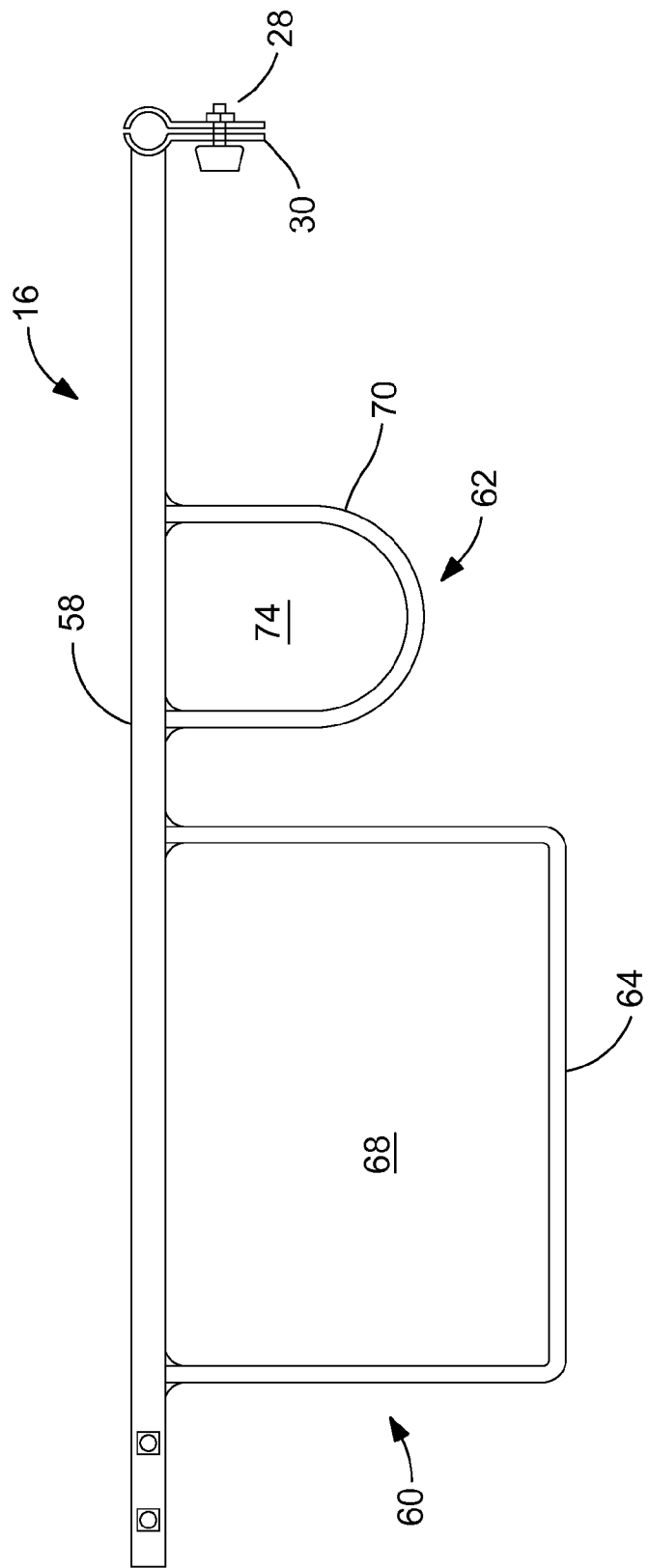
FIG. 9 is a top view of a gear holder arm of a hunter gear organizer and hanger system in accordance with the present invention.

With reference to FIG. 9, the gear holder arm 16 preferably includes a gear support tube 58, the mounting clamp 28, a gear pouch 60 and a drink pouch 62. The first clamp plate 30 is attached to a first end of the gear support tube 58 with welding or the like. The gear pouch 60 preferably includes a gear peripheral frame 64, a gear fabric pouch 66 and a gear bottom plate 68. The gear peripheral 64 frame has a general C-shape. Each end of the gear peripheral 64 is preferably attached to the gear support tube 58. A perimeter of the gear fabric pouch 66 is attached to the gear peripheral frame 64 and the gear support tube 58 with any suitable method. The gear bottom plate 68 is attached to or placed in a bottom of the gear fabric pouch 66. The drink pouch 62 preferably includes a drink peripheral frame 70, a drink fabric pouch 72 and a drink bottom plate 74. The drink peripheral frame 70 has a general C-shape. Each end of the drink peripheral frame 70 is preferably attached to the gear support tube 58 with welding or the like. A perimeter of the drink fabric pouch 72 is attached to gear peripheral frame 70 and the gear support tube 58. The drink bottom plate 74 is attached to or placed in a bottom of the drink fabric pouch 62.

Figure 10:
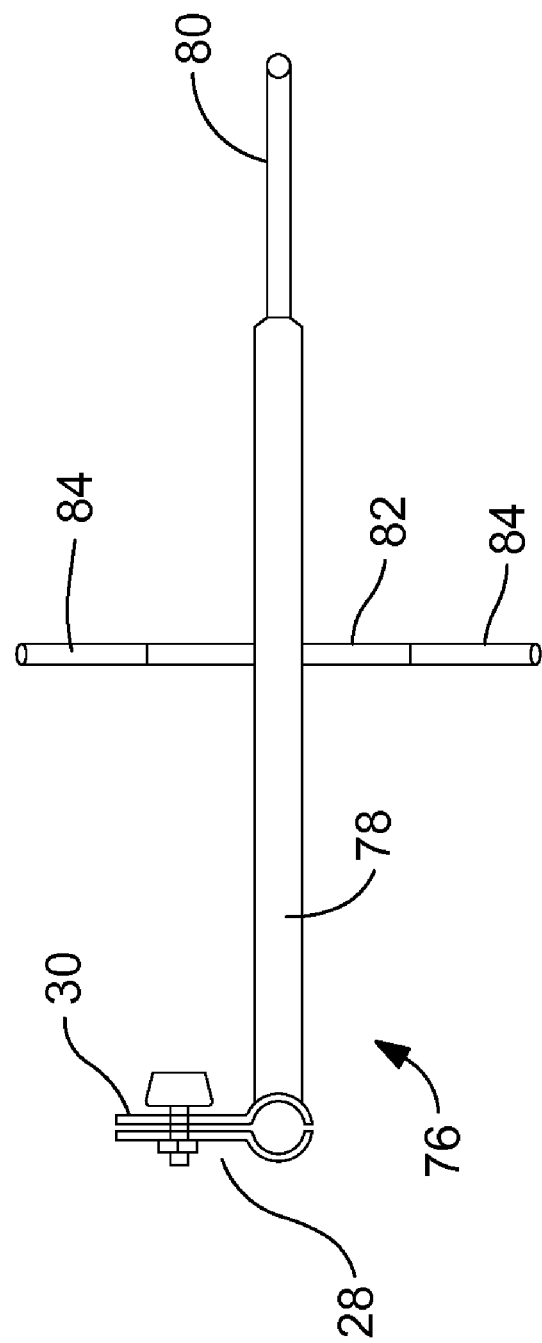
FIG. 10 is a top view of an accessory hanger of a hunter gear organizer and hanger system in accordance with the present invention.

With reference to FIG. 10, an accessory hanger 76 includes the mounting clamp 28, an accessory base member 78, an accessory hook 80 and a cross hanger 82. The mounting clamp 28 is preferably attached to a first end of the accessory base member 78 with welding or the like. The cross hanger 82 is preferably attached across the accessory base member 78 with welding or the like. Each end 84 of the cross hanger 82 is preferably bent upwards. The accessory hook 80 preferably includes a horizontal portion 86 and a vertical portion 88. The accessory hook 80 extends from a second end of the accessory base member 78.

Figure 11:
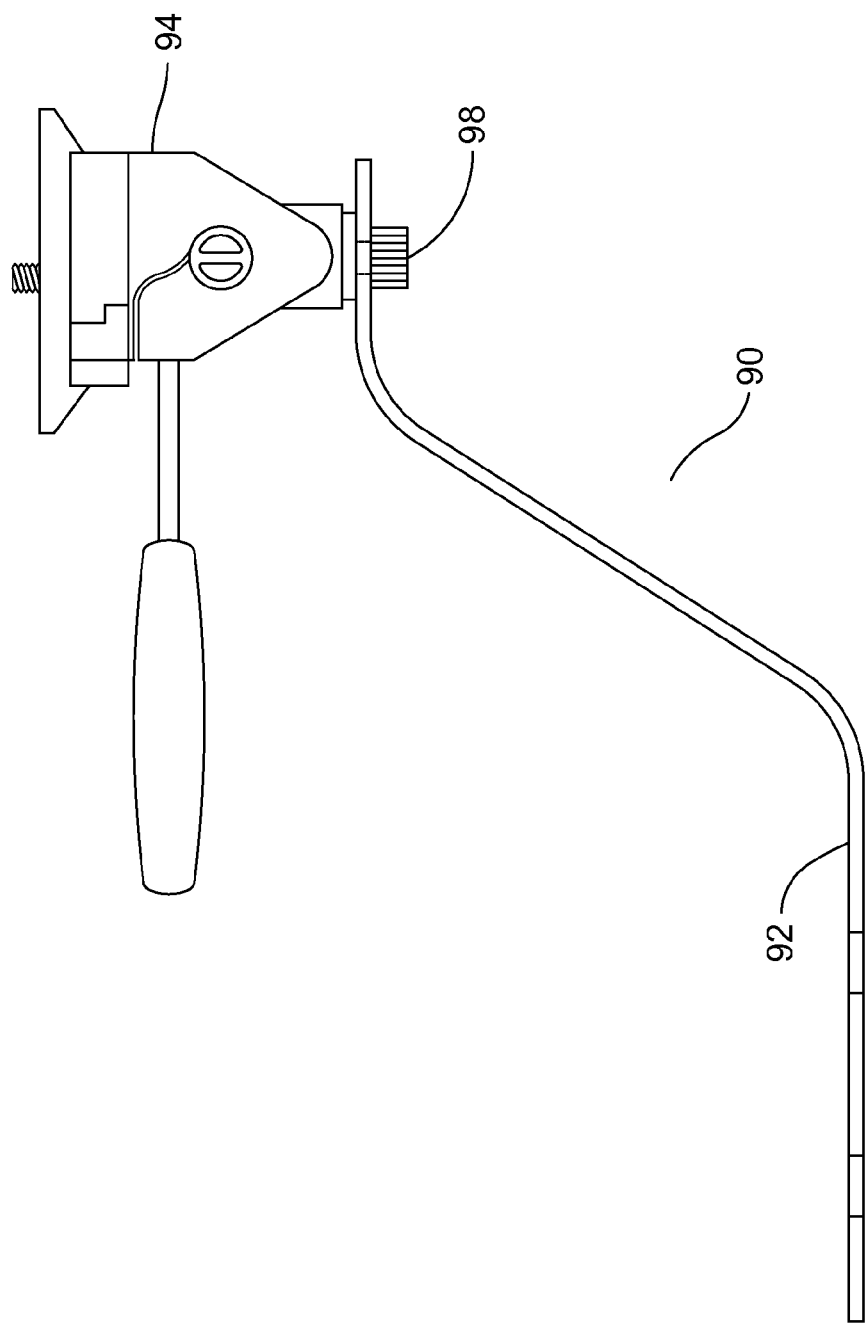
FIG. 11 is a side view of a camera mount accessory of a hunter gear organizer and hanger system in accordance with the present invention.

With reference to FIG. 11, a camera mount accessory 90 includes a camera support strip 92 and a tripod head 94. The camera support strip 92 includes an offset shape to raise the tripod head 94 above the gear support tube 58. One end of the camera support strip 92 is preferably attached to a second end of the gear support tube 58 with fasteners 96. The tripod head 94 is preferably attached to the other end of the camera support strip 58 with a fastener 98. The tripod head 94 may be purchased from any suitable retailer.

With reference to FIG. 12, a strut concealment stem support 110 includes the mounting clamp 28, a stem support tube 112 and at least one stem tube 114. A first end of the stem support tube 112 is preferably attached to the first clamp plate 30 with welding or the like and the at least one stem tube 114 is attached to a second end of the stem support tube 112. Each stem tube 114 is sized to receive a real or artificial branch 102 of a tree. With reference to FIGS. 13-14, a gear concealment stem support 116 includes a gear support strip 118 and at least one stem tube 120. The gear support strip 118 preferably includes a horizontal portion 122 and an angled portion 124. One end of the horizontal portion 122 is attached to a second end of the gear support tube 58 with fasteners 96. The at least one stem tube 120 is attached to the angled portion 124.

The hunter gear organizer and hanger system 1 is preferably secured to a tree 100 in the following manner. The pair of U-shaped members 20 of the mounting strut 10 are placed against a vertical portion of the tree 100. The strap end 25 is inserted through the attachment loop; the strap 24 is wrapped around a vertical portion of the tree 100; and the strap end 25 is inserted into the ratchet mechanism 26. The ratchet mechanism 26 is actuated, until the mounting strut 19 is secured against the tree 100. The hanger arm 14, the gear holder arm 16, the accessory hanger 76 and the strut concealment stem support 110 may be attached to the mounting strut 10, before or after the mounting strut 10 is attached to the tree 100. The camera mount accessory 90 and the gear concealment stem support 116 may be attached to the gear support tube 58, before or after the mounting strut 10 is attached to the tree 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A hunter gear organizer and hanger system comprising:
   a mounting strut includes a rod member and at least two generally U-shaped members, one of said at least two U-shaped members is attached to substantially one end of said rod member and the other one of said at least two U-shaped members is attached to substantially the other end of said rod member; and
   at least one hanger, each one of said at least one hanger includes a clamp and an arm, said clamp includes a tightening device, said arm extends from said clamp, said clamp is removably retained on said mounting strut, said clamp is pivotally engaged with said mounting strut such that said clamp pivots relative to said mounting strut in a substantially horizontal plane when said tightening device is loosened, wherein said arm retains at least one item.

2. The hunter gear organizer and hanger system of claim 1, further comprising:
   a ratchet strap includes a strap and a ratchet mechanism, wherein said strap retains said mounting strut against a tree, said ratchet mechanism tensions the strap against the tree.

3. The hunter gear organizer and hanger system of claim 1 wherein:
   said clamp includes a first clamp plate, a second clamp plate and at least one tightening bolt, a first channel is formed in said first clamp plate to receive said rod member, a second channel is formed in said second clamp plate to receive said rod member, said at least one tightening bolt is tightened to secure said first and second clamps against each other.

4. The hunter gear organizer and hanger system of claim 1, further comprising:
   one of said at least one hanger includes said clamp and said arm, said arm includes a support tube and a bow hanger, one end of said support tube is attached to said clamp, said bow hanger is pivotally attached to the other end of said support tube.

5. The hunter gear organizer and hanger system of claim 4, further comprising:
   a quiver hanger is attached to said support tube.

6. The hunter gear organizer and hanger system of claim 1, further comprising:
   one of said at least one hanger includes said clamp and said arm, said arm includes a gear support tube and at least one pouch, one end of said gear support tube is attached to said clamp, said at least one pouch is attached to said gear support tube.

7. The hunter gear organizer and hanger system of claim 6, further comprising:
   a camera mount accessory includes a camera support strip and a tripod head, one end of said camera support strip is secured to the other end of said gear support tube, said tripod head is retained on the other end of said camera support strip.

8. The hunter gear organizer and hanger system of claim 6, further comprising:
   means for retaining a tree branch, said means for retaining is attached to one of said rod member and said gear support tube.

9. The hunter gear organizer and hanger system of claim 1, further comprising:
   one of said at least one hanger includes said clamp and said arm, said arm includes an accessory base member and an accessory hook, one end of said accessory base member is attached to said clamp, said accessory hook is attached to the other end of said accessory base member.

10. A hunter gear organizer and hanger system comprising:
    a mounting strut includes a rod member and at least two generally U-shaped members, one of said at least two U-shaped members is attached to substantially one end of said rod member and the other one of said at least two U-shaped members is attached to substantially the other end of said rod member; and
    at least one hanger, each one of said at least one hanger includes a clamp and an arm, said clamp includes a first clamp plate, a second clamp plate and a tightening device, said arm extends from one of said first and second clamp plates, said clamp is removably retained on said mounting strut, said first and second clamp plates are pivotally engaged with said mounting strut such that said clamp pivots relative to said mounting strut in a substantially horizontal plane when said tightening device is loosened, wherein said arm retains at least one item.

11. The hunter gear organizer and hanger system of claim 10, further comprising:
    a ratchet strap includes a strap and a ratchet mechanism, wherein said strap retains said mounting strut against a tree, said ratchet mechanism tensions the strap against the tree.

12. The hunter gear organizer and hanger system of claim 10 wherein:
    a first channel is formed in said first clamp plate to receive said rod member, a second channel is formed in said second clamp plate to receive said rod member, said tightening bolt is tightened to secure said first and second clamps against each other.

13. The hunter gear organizer and hanger system of claim 10, further comprising:
    one of said at least one hanger includes said clamp and said arm, said arm includes a support tube and a bow hanger, one end of said support tube is attached to said clamp, said bow hanger is pivotally attached to the other end of said support tube.

14. The hunter gear organizer and hanger system of claim 10, further comprising:
    one of said at least one hanger includes said clamp and said arm, said arm includes a gear support tube and at least one pouch, one end of said gear support tube is attached to said clamp, said at least one pouch is attached to said gear support tube.

15. The hunter gear organizer and hanger system of claim 14, further comprising:
    means for retaining a tree branch, said means for retaining is attached to one of said rod member and said gear support tube.

16. The hunter gear organizer and hanger system of claim 10, further comprising:

one of said at least one hanger includes
said clamp and said arm, said arm includes an accessory base member and an accessory hook, one end of said accessory base member is attached to said clamp, said accessory hook is attached to the other end of said accessory base member.

17. A hunter gear organizer and hanger system comprising:
a mounting strut includes a rod member, at least two generally U-shaped members and a loop, said rod member has a round cross section, one of said at least two U-shaped members is attached to substantially one end of said rod member and the other one of said at least two U-shaped members is attached to substantially the other end of said rod member, said loop is attached to said rod member between said at least two U-shaped members;
a ratchet strap includes a strap and a ratchet mechanism, wherein said strap retains said mounting strut against a tree, said ratchet mechanism tensions the strap against the tree; and
at least one hanger, each one of said at least one hanger includes a clamp and an arm, said arm extends from said clamp, said clamp is removably retained on said mounting strut, said first and second clamp plates are pivotally engaged with said mounting strut such that said clamp pivots relative to said mounting strut in a substantially horizontal plane when said tightening device is loosened, wherein said arm retains at least one item.

18. The hunter gear organizer and hanger system of claim 17 wherein:
said clamp includes a first clamp plate, a second clamp plate and at least one tightening bolt, a first channel is formed in said first clamp plate to receive said rod member, a second channel is formed in said second clamp plate to receive said rod member, said at least one tightening bolt is tightened to secure said first and second clamps against each other.

19. The hunter gear organizer and hanger system of claim 17, further comprising:
one of said at least one hanger includes said clamp and said arm, said arm includes a support tube and a bow hanger, one end of said support tube is attached to said clamp, said bow hanger is pivotally attached to the other end of said support tube.

20. The hunter gear organizer and hanger system of claim 17, further comprising:
one of said at least one hanger includes said clamp and said arm, said arm includes a gear support tube and at least one pouch, one end of said gear support tube is attached to said clamp, said at least one pouch is attached to said gear support tube.

* * * * *